No. 824,460. PATENTED JUNE 26, 1906.
G. R. WILLIAMS.
DETECTING MECHANISM.
APPLICATION FILED OCT. 3, 1904.

3 SHEETS—SHEET 1.

Witnesses

Inventor
George R. Williams
By his Attorneys

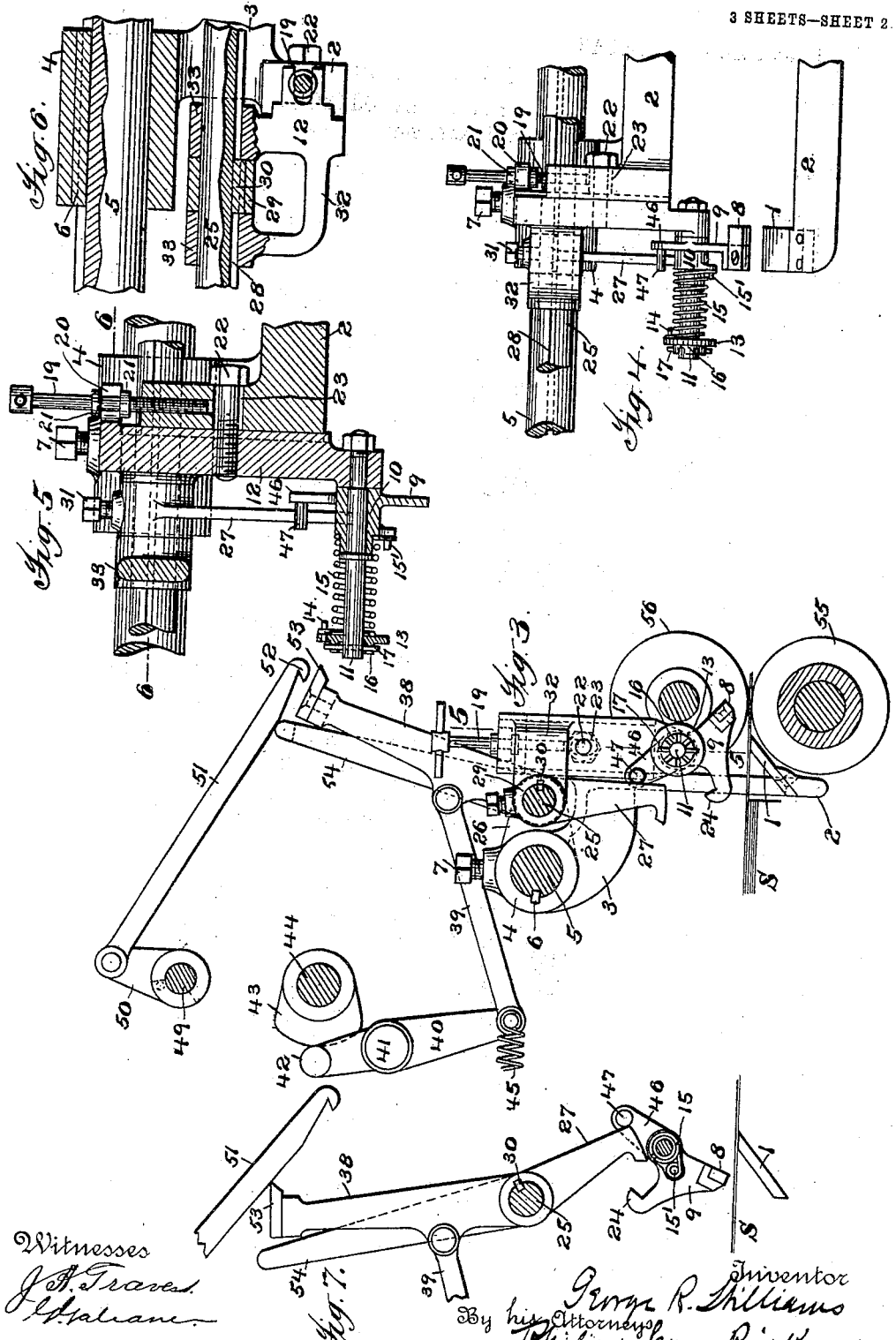

No. 824,460. PATENTED JUNE 26, 1906.
G. R. WILLIAMS.
DETECTING MECHANISM.
APPLICATION FILED OCT. 3, 1904.
3 SHEETS—SHEET 3.
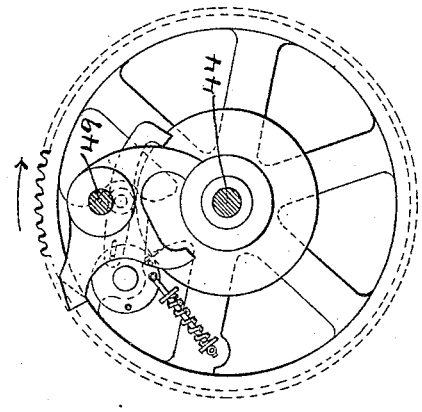
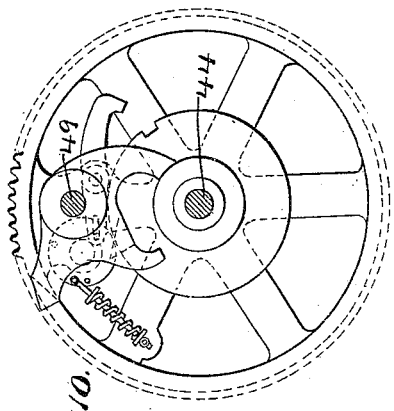
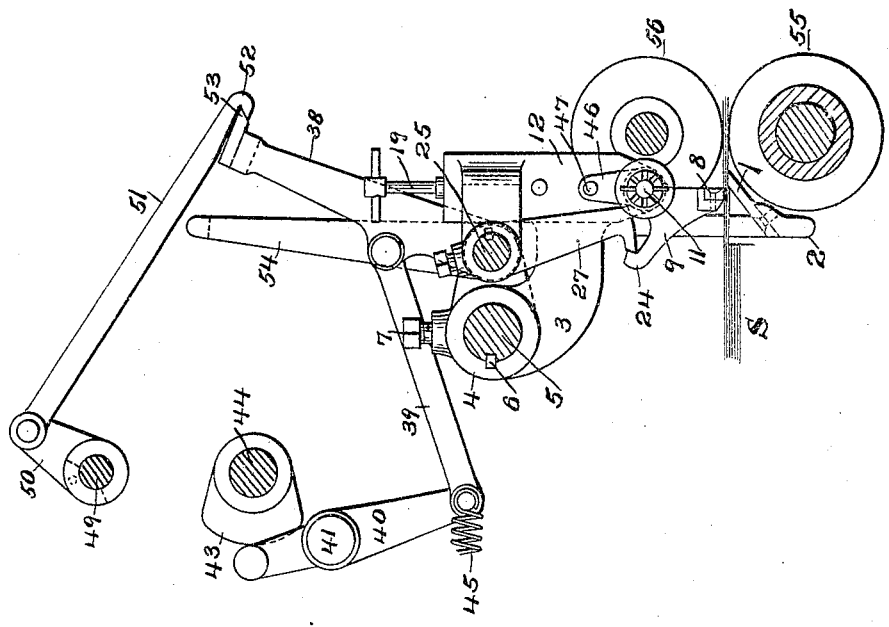

UNITED STATES PATENT OFFICE.

GEORGE R. WILLIAMS, OF NEW YORK, N. Y., ASSIGNOR TO E. C. FULLER COMPANY, OF NEW YORK, N. Y., A CORPORATION OF NEW YORK.

DETECTING MECHANISM.

No. 824,460.        Specification of Letters Patent.        Patented June 26, 1906.

Application filed October 3, 1904. Serial No. 226,912.

*To all whom it may concern:*

Be it known that I, GEORGE R. WILLIAMS, a citizen of the United States, residing at New York, county of Kings, and State of New York, have invented certain new and useful Improvements in Detecting Mechanism, fully described and represented in the following specification and the accompanying drawings, forming a part of the same.

This invention relates to certain improvements in detecting mechanism.

In the operation of feeding sheets to machines—such as printing-machines, folding-machines, and the like—which operate upon sheets it is important that only a single sheet be fed to the machine at a time. Devices have therefore been heretofore employed which had for their object to detect the presence in the sheet-path of more than a single sheet, said devices operating when more than a single sheet was present in the sheet-path to stop the machine or machines with which they were connected.

The present invention has for its object to produce a mechanism of the general class referred to which shall be simple and which may therefore be cheaply constructed and which shall be effective in its operation.

With this and other objects not specifically referred to in view the invention consists in certain constructions and in certain parts, improvements, and combinations, as will be hereinafter fully described and then specifically pointed out in the claims hereunto appended.

Figure 1:
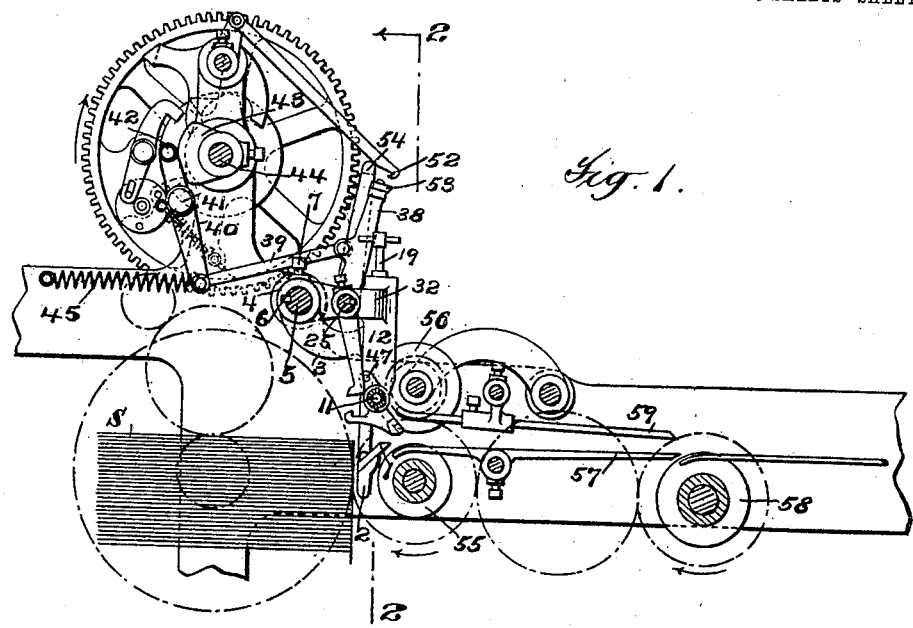
Figure 2:
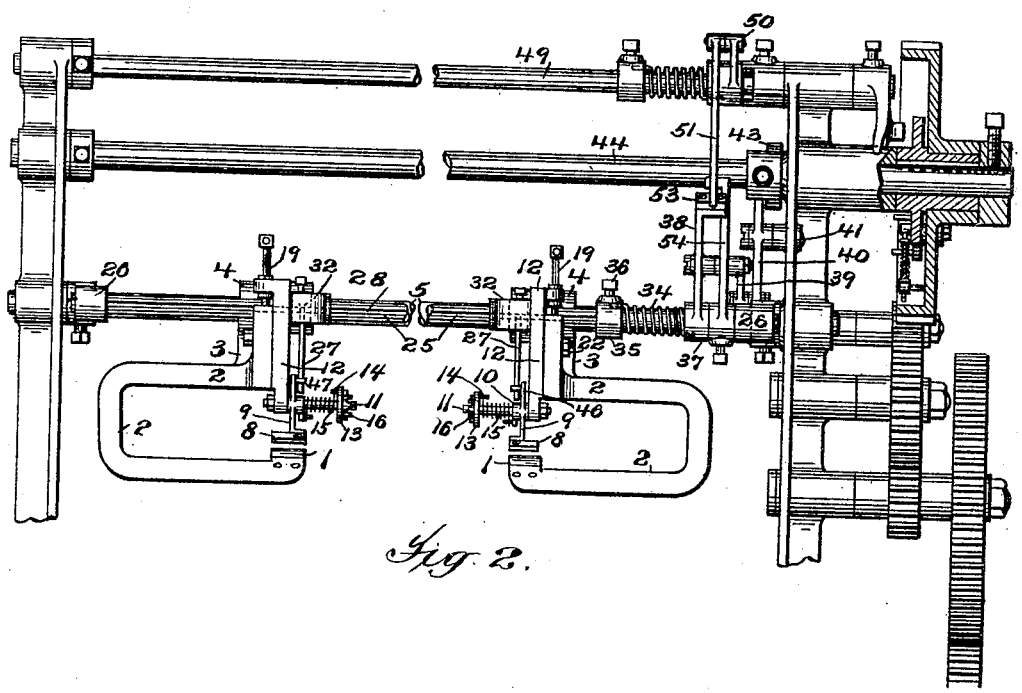

In the accompanying drawings, Figure 1 represents a side elevation, partly in section, of one form of the improved detecting mechanism. Fig. 2 is a sectional elevation on the line 2 2 of Fig. 1, certain parts being omitted. Fig. 3 is a diagrammatic detail view, certain parts being shown in section. Fig. 4 is an elevation of a detector member and the parts immediately connected therewith. Fig. 5 is a section on the line 5 5 of Fig. 3. Fig. 6 is a section on the line 6 6 of Fig. 5. Fig. 7 is a detail view of one of the detector members and parts immediately connected therewith. Fig. 8 is a view similar to Fig. 3, but showing the parts in different positions. Fig. 9 is an elevation of a clutch mechanism which may be employed; and Fig. 10 is a view similar to Fig. 9, showing the parts in different positions.

Referring to the drawings, which illustrate one embodiment of the invention, the improved detecting mechanism is shown in connection with certain parts of a paper-folding machine. It is to be understood, however, that the detecting mechanism may be used in any other relation. In the drawings the sheets to be fed are illustrated at S in Fig. 1. These sheets will of course rest upon a support of suitable character, such support not being shown, as an illustration thereof is unnecessary for an understanding of the invention. The sheets being fed will pass from the support in the preferred form of the construction over a suitable abutment, which may be widely varied in its construction.

In the preferred form of the construction, and as shown, the abutment consists of two members 1. The two members which constitute the abutment when two members are employed may be supported in any suitable manner. In the preferred construction, however, and as shown, they will be mounted on brackets 2, which are connected to rearwardly-extending arms 3, said arms having hubs or bosses 4 thereon, which are arranged to engage a cross-bar or stationary shaft 5. In the preferred construction, furthermore, the connection between the abutment-carrying devices and the support, whatever form may be given to these devices, is of such a character as to enable the two parts of the abutment to be adjusted on the support. While this connection may be of any suitable character, as shown, the cross-bar 5 and the hubs 4 are provided with opposing grooves in which is inserted a key 6. For further security in holding the parts in their adjusted position set-screws 7 are or may be employed.

In the preferred construction, and as shown, the abutment will be stationary with respect to the passing sheet, the construction differing in this respect from prior devices which have gone into practical use in which a roller is employed as an abutment.

The detector employed in carrying out the invention may be varied widely in construction and will vary according to the particular mechanism in which the invention is employed. In the best construction, however, the detector will be given a sweeping movement over the sheet-path and will be arranged so that its movement may be varied by the presence in the sheet-path of a predetermined amount of sheet material. In other words, the detector when used for the purpose of detecting the presence in the sheet-path of more than a single sheet will be arranged to sweep over the sheet-path when there is a single sheet in the sheet-path, as distinguished from moving toward and away from the sheet-path, and to have this sweeping movement checked or otherwise varied when there is more than a single sheet in the sheet-path. In the particular construction shown, furthermore, the detector consists of two members, one being located on each side of the sheet-path, although it is to be understood that a single detector member or more than two members might be employed, if desired. As shown, the detector construction includes two plates 8, these plates being carried on arms 9, which depend from hubs 10. In the best constructions and as shown, the movement which the detector has over the sheet-path will be an oscillating movement, and to this end the hubs 10 are mounted on studs 11, which are carried in brackets 12.

The particular means by which the detector is given its movement may be considerably varied; but in the best constructions the movement of the detector members in one direction will be effected by springs which may be variously arranged and located. As shown, each of the studs 11 carries a disk 13, these disks being provided with pins 14, to which light torsion-springs 15 are connected, the springs being wound around the studs. The hubs 10 are further provided with pins 15', to which the other ends of the springs 10 are connected. With this construction it will be readily understood that when the spring is under tension the detector members will be swung by the springs, if nothing prevents the movement, and it will be further seen that the movement produced by these light springs will be readily checked or varied, if there is an obstruction in the path of the detector members. By adjusting these members, therefore, at a proper distance from the abutment they will be caused to swing freely over a single sheet of paper lying in the sheet-path; but the movement of the members produced by the springs will be checked or varied, if, for instance, there is more than a single sheet of paper lying in the sheet-path. Means are preferably provided for regulating the torsion of the springs, which means may be of any suitable character. As shown, the disks 13 have notched hubs 16, (see Figs. 2 and 4,) the notches of these hubs engaging with pins 17, supported in the ends of the stud 11. The disks are held up against the pins by the expansive force of the springs. The torsion of the springs may readily be varied by pushing the springs back and turning the disks in the proper direction.

Means will preferably be provided for adjusting the detector members toward and away from the abutment with which they coöperate. While these members may be of any suitable character, in the construction shown the brackets 12 are formed to move in ways in the brackets 3, the position of the brackets 12 in the brackets 3 being determined by micrometer-screws 19, which pass through yokes 20, extending from the brackets 12. The screws 19 in the construction shown are provided with collars 21, one of the collars being located above and the other below the yokes 20. These screws 19 (see Fig. 5) are tapped into threaded openings in the brackets 2. Additional locking devices may, if desired, be employed. As shown, these locking devices comprise screws 22, which pass through slots 23 in the brackets 2 and are tapped into the brackets 12.

In the best constructions a controller will be employed in connection with the detector members, the purpose of which generally is to enable said members to control, through proper intermediate devices, the action of the machine-stopping mechanism. Preferably, also, this controller will have movements corresponding with the movements of the detector. The construction of the controller may be varied widely. In the particular construction shown, however, the controller consists of a pair of hooks 24, there being one hook for each detector member. In the preferred construction and as shown these hooks are formed integral with and extend forward from the arms 9, which carry the detector members 8.

In order that the variations in the movement of the detector due to more than the predetermined thickness of material in the sheet-path may be made effective to control the stopping devices, there is provided an operating member, to which the variations in the movement of the detector members are transmitted. This operating member may be varied widely in construction and operation. It will, however, preferably be a moving member. In the best constructions and as shown this operating member consists of a shaft 25, which is journaled in brackets 26, extending forward from the support 5, although this shaft might be mounted in any desired manner.

The means by which the variations in movement of the detector are transmitted to the operating member, whatever its form, may be widely varied. As shown, the operating member is provided with a plurality of depending arms 27, one for each detector member, the lower portions of which come at certain times, as will be hereinafter described, within the range of action of the controllers 24. These arms may be secured to the shaft 25 in any desired manner. As shown, the shaft is provided with a slot 28, and each of the hubs 29 of the arms 27 is provided with a feather 30, (see Fig. 6,)

which enters the groove or spline in the shaft. For making the connection perfectly rigid an additional locking device—as, for instance, a screw 31—is provided.

It has been heretofore stated that the hubs 4, by which the brackets 3 are connected to the support, are secured to the support by a tongue-and-groove connection. This connection, it is obvious, will permit the brackets 2, the parts of the abutment carried thereby, and the detector members to be readily adjustable toward and away from each other in order to provide for varying widths of sheets.

In order that the arms 27, which in the construction shown form the means for transmitting the movement of the controllers to the operating-shaft 25, may be adjusted, means are provided by which the arms are caused to be moved whenever the brackets 2 are moved. While these means may be of any suitable character, in the construction shown the brackets 12 are provided with extensions 32, (see Fig. 6,) each of these extensions being in turn provided with a pair of collars 33, which embrace the shaft 25 and lie on each side of the hubs 29. It is apparent, therefore, that when the brackets are adjusted the arms 27 will be adjusted with them, the splined construction by which the hubs of these arms are connected to the shaft readily permitting this movement.

The movement of the operating member, which, as has been before described, consists of the shaft 25, may be effected in any desired manner, the means employed varying, of course, with the construction of this operating member and the character of the movement which is given it. In the construction shown the movement is an oscillating movement, corresponding generally with the movement given to the detector before described. In the particular construction shown this oscillating movement of the operating-shaft is produced by means of a spring 34, which may be variously located. As shown, one end of the spring is fast to a collar 35, secured by a set-screw 36 to the shaft, and the other end of the spring is secured to a hub 37, which is loose on the shaft, said hub carrying an arm 38, which will be hereinafter referred to.

The operating member is employed for the purpose of making the variations in the movement of the detector members effective to control the operation of machine-stopping devices. The connections by which the operating member transmits the variations in movement of the detector members may be varied widely and will vary according to the particular character of the stopping mechanism employed and according to the means employed for actuating the stopping mechanism. In the construction shown the stopping mechanism is actuated from an actuator mechanism, said actuator mechanism in the particular construction shown including an actuator-arm, this being the arm 38 before referred to as extending from the hub 37. This actuator-arm may be operated in any desired manner. As shown, it is connected by a link 39 to a cam-lever 40, pivoted at 41 to the frame of the machine, said cam-lever being provided with a bowl or roller 42, which is operated upon by a cam 43, said cam being mounted on a shaft 44, which is one of the main shafts of the machine. A spring 45 is or may be employed to give the lever 40 a movement in opposition to that produced by the cam.

The shaft 44 is given a complete rotation for each sheet fed past the detector, and during this rotation of the shaft the actuator-arm 38 is given a complete reciprocation. During this reciprocation of the arm 38 the shaft 25 is given an oscillating movement in both directions, assuming that there is no more than the predetermined thickness of material in the sheet-path. This oscillating movement of the shaft 25 produces, in turn, an oscillating movement of the arms 27.

The hubs 10, before referred to as carrying the arms 9, are provided in the particular construction shown with upwardly-extending arms 46, these arms carrying pins 47, which lie directly behind the arms 27. As these arms move backward, therefore, they serve to turn the hubs 10 around the studs 11, thus rocking the arms 9, which movement increases the tension on the springs 15 and at the same time carries the detector members backward into the position shown in Fig. 7, which is the position they occupy when the sheet is fed. When the actuator-arm 38 has completed its backward movement—that is, its movement into the position shown in Fig. 7—and the detector members have assumed the position shown in this figure, the sheet is fed forward, and at this time the arm 38 begins its forward movement. As this arm moves forward the spring 34 rocks the operating-shaft 25 and causes the arms 27 to begin their backward movement. As these arms move backward the detector members begin their forward movement, and if there is no more than the predetermined thickness of paper in the sheet-path—that is, for instance, no more than a single sheet overlying the abutment 1—the detector-fingers will continue their forward movement, which movement will continue until the detector members reach the position illustrated in Fig. 3. If, however, there be more than the predetermined thickness of sheet overlying the abutment 1—that is, for instance, if two or more sheets have been fed—the movement of the detector members will be stopped. The position in which the detector members are brought to rest by the predetermined thickness of sheet is illustrated in Fig. 8, and it will be observed that at this time the arms 27 are within the range of action of the controllers 24, so that the stopping of the movement of the detector members will cause the controllers to engage the arms 27, and this engagement will bring the shaft 25 to a stop. It is this variation in movement in the particular mechanism shown which brings the stopping mechanism into action.

The particular mechanism by which the operating member, which in the particular construction shown is the shaft 25, brings the stopping mechanism into action may be widely varied and will vary according to the particular construction of stopping mechanism and actuating mechanism. In the construction illustrated the stopping devices include a shaft 49, which is the shaft which controls the operation of a clutch mechanism to be hereinafter referred to. This shaft 49 is provided with an arm 50, and between this arm and the actuating mechanism are provided intermediate connections which are controlled by the variation in movement of the operating member—that is, in the particular construction shown the shaft 25. These intermediate connections may be widely varied in form and construction; but they will preferably be of such a character as to be normally engaged or actuated by the actuator unless the engagement be prevented by devices actuated from the operating member. In the particular construction shown the arm 50 has connected thereto a link 51, which is provided on its end with a hook 52, this hook being within the range of action under certain conditions of a beveled plate 53, mounted on the arm 38. The position of this intermediate connection 51 52 is determined by positioning devices under the control of the shaft 25. While these positioning devices may be of any suitable character, in the construction shown the shaft 25 is provided with a lifter-arm 54, to which an oscillating movement is imparted by the shaft. If the shaft 25 is allowed to complete its oscillation, as it will be if the movement of the detector be not varied, the arm 54 will lift the link 51, so that the beveled plate 53 will not engage the hook 52, this position of the parts being shown in Fig. 3. If, however, the movement of the detector members be varied, so that the movement of the shaft 25 is varied by the operation of the controller, the positioning-arm 54 will not complete its movement and the plate 53 on the actuating-arm 38 will engage the hook 52. As the actuating-arm is positively moved by the cam, its further movement after the plate 53 has engaged the hook 52 will rock the shaft 49 and in the construction shown will throw out the clutch, bringing the machine to a stop.

Any suitable form of clutch mechanism may be employed. A clutch mechanism which is suitable for the purpose is fully illustrated in Figs. 9 and 10. This clutch mechanism is fully described in Patent No. 714,423, dated November 25, 1902, said patent having been granted to the Economic Machine Co., of New York, as the assignee of George R. Williams. Inasmuch as a description of the particular form of clutch mechanism employed will not assist in an understanding of the invention, such description is omitted in the interest of brevity, reference being made to the patent above specified for a full description thereof.

The mechanism for controlling the sheet after it passes the detector mechanism may vary and will vary according to the character of the machine with which the detector mechanism is employed. In the construction shown the sheet is received on a roller 55, with which a drop-roller 56 of ordinary form coöperates. These rollers forward the sheet across bridge-pieces 57 to another forwarding-roller 58. Fingers 59 are shown, which, together with the bridge-pieces 57, form a throat through which the sheet is passed, this construction being an ordinary one in printing and folding machinery.

It will be observed that in the particular construction shown the detector members are given a movement under a light impelling force, which movement is checked or varied by the presence in the sheet-path of a predetermined thickness of material. While the invention is not as to all of its features limited to this particular form of detector members, the preferred construction will embody it, and it will be seen that it possesses great advantages in that there are no stationary parts to be moved by the advancing sheets, the detecting operation being effected by varying the movement of the detector rather than by causing the delicate and fragile sheets to set into operation parts which are otherwise stationary. Furthermore, the particular construction illustrated and others in which the invention may be embodied lend themselves readily to the employment of two detectors members, either one of which is sufficient in itself to cause the operation of the stopping mechanism, and the position of these two detector members, when two are employed, may be readily and quickly adjusted for different widths of sheet. Furthermore, the work to be done by the detector in operating the stopping mechanism is reduced to a minimum, so that the parts may be made light, and as the construction involves no complicated mechanism it may be cheaply made.

Changes and variations may be made in the construction by which the invention is carried into effect. While, therefore, the specific construction which has been described as embodying the invention is a preferred one, it is to be understood that the invention is in no way limited thereto, as other constructions embodying the invention may be made which differ widely therefrom.

What is claimed is—

1. In a detecting mechanism, the combination with a stop mechanism, of a detector, means for giving the detector a sweeping movement over the material-path, said detector being constructed to have its movement interrupted by the presence in the material-path of a predetermined thickness of material, and means whereby the interruption in the movement of the detector controls the operation of the stop mechanism, substantially as described.

2. In a detecting mechanism, the combination with a stop mchanism, of a detector, an abutment stationary with respect to the passing material coöperating with the detector and lying on the opposite side of the material-path, means for giving the detector a sweeping movement over the path of the material, said detector being constructed to have its movement varied by the presence in the path of the material of a predetermined thickness of material, and means whereby the variation in the movement of the detector controls the operation of the stop mechanism, substantially as described.

3. In a detecting mechanism, the combination with a stop mechanism, of a detector, means for giving the detector a sweeping movement over the path of the material, said detector being arranged to have its movement checked by the presence in the material-path of a predetermined thickness of material, and means whereby the checking of the detector movement controls the operation of the stopping mechanism, substantially as described.

4. In a detecting mechanism, the combination with a stop mechanism, of a detector, an abutment stationary with respect to the path of the material coöperating with the detector and lying on the opposite side of the material-path, means for giving the detector a sweeping movement over the material-path, said detector being constructed to have its movement checked by the presence in the material-path of a predetermined thickness of material, and means whereby the variation in the movement of the detector controls the operation of the stop mechanism, substantially as described.

5. In a detecting mechanism, the combination with a stop mechanism, of a detector, means for oscillating the detector over the path of the material and tangentially to said path, said detector being constructed to have its oscillating movement interrupted by the presence in the path of the material of a predetermined thickness of material, and means whereby interruption in the oscillating movement of the detector controls the operation of the stop mechanism, substantially as described.

6. In a detecting mechanism, the combination with a stop mechanism, of a detector, an abutment stationary with respect to the passing material coöperating with the detector and lying on the opposite side of the material-path, means for oscillating the detector over the path of the material and tangentially to said path, said detector being constructed to have its oscillating movement varied by the presence in the path of the material of a predetermined thickness of material, and means whereby variation in the oscillating movement of the detector controls the operation of the stop mechanism, substantially as described.

7. In a detecting mechanism, the combination with a stop mechanism, of a detector, means for giving the detector a sweeping movement over the path of the material, said detector being arranged to have its movement varied by the presence in the material-path of a predetermined thickness of material, operating connections for the stop mechanism, positioning devices for said connections, and means including a controller for operating said positioning devices, said controller moving with the detector, substantially as described.

8. In a detecting mechanism, the combination with a stop mechanism, of a detector, an abutment stationary with respect to the passing material coöperating with said detector and lying on the opposite side of the material-path, means for giving the detector a sweeping movement over the material-path, said detector being arranged to have its movement varied by the presence in the material-path of a predetermined thickness of material, operating connections for the stop mechanism, positioning devices for said connections, and means including a controller for operating said devices said controller moving with the detector, substantially as described.

9. In a detecting mechanism, the combination with a stop mechanism, of a detector, means for oscillating the detector over the path of the material and tangentially to said path, said detector being arranged to have its movement varied by the presence in the material-path of a predetermined thickness of material, operating connections for the stop mechanism, positioning devices for said connections, and means including a controller for operating said positioning devices, said controller moving with the detector, substantially as described.

10. In a detecting mechanism, the combination with a stop mechanism, of a detector, an abutment stationary with respect to the passing material coöperating with said detector and lying on the opposite side of the material-path, means for oscillating the detector over the material-path and tangentially to said path, said detector being arranged to have its movement varied by the presence in the material-path of a predetermined thickness of material, operating connections for the stop mechanism, positioning devices for said connections, and means including a controller for operating said positioning devices, said controller moving with the detector, substantially as described.

11. In a detecting mechanism, the combination with a stop mechanism, of operating connections therefor, positioning devices for said connections, a detector, means for giving the detector a sweeping movement over the material-path, said detector being constructed to have its movement interrupted by the presence in the material-path of a predetermined thickness of material, and means whereby the detector controls the operation of the positioning devices, substantially as described.

12. In a detecting mechanism, the combination with a stop mechanism, of operating connections therefor, positioning devices for said connections, a detector, an abutment stationary with respect to the passing material coöperating with said detector and lying on the opposite side of the path of the material, means for giving the detector a sweeping movement over the material-path, said detector being constructed to have its movement varied by the presence in the material-path of a predetermined thickness of material, and means whereby the detector controls the operation of the positioning devices, substantially as described.

13. In a detecting mechanism, the combination with stopping devices, of an actuator therefor, connections between the actuator and the stopping devices, positioning devices for said connections, a detector, means for giving the detector a sweeping movement over the path of the material, and means including a controller moving with the detector for operating the positioning devices, substantially as described.

14. In a detecting mechanism, the combination with stopping devices, of an actuator therefor, connections between the actuator and the stopping devices, positioning devices for said connections, a detector, means for oscillating the detector over the path of the material and tangentially thereto, and means including a controller oscillating with the detector for operating the positioning devices, substantially as described.

15. In a detecting mechanism, the combination with stopping devices, of an actuator therefor, connections between the actuator and the stopping devices, positioning devices for said connections, a detector, means for oscillating the detector over the path of the material and tangentially thereto, an abutment stationary with respect to the passing material coöperating with said detector and lying on the opposite side of the path of the material, and means including a controller oscillating with the detector for operating the positioning devices, substantially as described.

16. In a detecting mechanism, the combination with stopping devices, of a detector comprising two detecting members, a support on which both members are mounted and along which they are adjustable toward and away from each other, an operating member common to both detecting members, connections between each detecting member and the common operating member, an actuator for the stopping devices, connections intermediate the actuator and the stopping devices, and means whereby the common operating member controls said connections, substantially as described.

17. In a detecting mechanism, the combination with stopping devices, of a detector comprising two detecting members, an abutment stationary with respect to the passing material coöperating with said members, a support on which said detecting members are mounted and along which they are adjustable, a common operating member, connections between each of the detecting members and the operating member, and means whereby the operating member controls the action of the stopping devices, substantially as described.

18. In a detecting mechanism, the combination with stopping devices, of a detector including two detecting members, a support on which both members are mounted and along which they are adjustable, an operating-shaft common to both detecting members, adjustable connections between said shaft and the detecting members, an actuator for the stopping devices, connections intermediate the actuator and the stopping devices, and means whereby the common operating-shaft controls the connections between the actuator and the stopping devices, substantially as described.

19. In a detecting mechanism, the combination with stopping devices, of a detector including two detecting members, a two-part abutment, the parts of said abutment coöperating with said detecting members, a support on which the detecting members and the abutment are mounted, the detecting members and the parts of the abutment being adjustable toward and away from each other along the support, an operating member common to both detecting members, connections between said common operating member and the detecting members, and means whereby the common operating member controls the stopping devices, substantially as described.

20. In a detecting mechanism, the combination with stopping devices, of a detector including two detecting members, a two-part abutment, the parts of said abutment coöperating with said detecting members, a support on which the detecting members and the abutment are mounted, the detecting members and the parts of the abutment being adjustable toward and away from each other along the support, an operating-shaft common to both detecting members, connections between said common operating-shaft and the detecting members, and means whereby the common operating-shaft controls the stopping devices, substantially as described.

21. In a detecting mechanism, the combination with stopping devices, of a detector including two detecting members, means for giving said detecting members sweeping movements over the material-path, said members being arranged so that either of them may have its movement interrupted by the presence in the material-path of a predetermined thickness of material, means for adjusting the detecting members with respect to each other, and means whereby interruption in the movement of either detecting member controls the operation of the stopping devices, substantially as described.

22. In a detecting mechanism, the combination with stopping devices, of a detector including two detecting members, means for moving the detecting members over the material-path, each of said members being arranged to have its movement varied by the presence in the material-path of a predetermined thickness of material, means for adjusting the detecting members with respect to each other, a two-part abutment, the parts of the abutment coöperating with the detecting members, means for adjusting the parts of the abutment with respect to each other, and means whereby a variation in the movement of either detecting member controls the operation of the stopping devices, substantially as described.

23. In a detecting mechanism, the combination with stopping devices, of a detector including two detecting members, means for giving the detector members a sweeping movement over the material, each of said members being arranged to have its movement varied by the presence in the material-path of a predetermined thickness of material, means for adjusting the detecting members with respect to each other, a two-part abutment, the parts of the abutment coöperating with the detecting members, means for adjusting the parts of the abutment with respect to each other, and means whereby a variation in the movement of either detecting member controls the operation of the stopping devices.

24. In a detecting mechanism, the combination with stopping devices, of a detector including two detecting members, means for moving the detecting members over the material-path, each of said members being arranged to have its movement varied by the presence in the material-path of a predetermined thickness of material, means for adjusting the detecting members with respect to each other, a two-part abutment, the parts of the abutment coöperating with the detecting members, means for adjusting the parts of the abutment with respect to each other, and means whereby a variation in the movement of either detecting member controls the operation of the stopping devices, substantially as described.

25. In a detecting mechanism, the combination with stopping devices, of a detector including two detecting members, a two-part abutment, the parts of the abutment coöperating with the detecting members, a support on which the detecting members and abutment are mounted and along which they are adjustable, a controller moving with each detecting member, a common operating member, means whereby a connection may be established between either detecting member and the common operating member, and means whereby the common operating member controls the operation of the stopping devices, substantially as described.

26. In a detecting mechanism, the combination with stopping devices, of a detector including two detecting members, means for giving the detecting members a sweeping movement over the material-path, a two-part abutment, the parts of the abutment coöperating with the detecting members, a support on which the detecting members and abutment are mounted and along which they are adjustable, a controller moving with each detecting member, a common operating member, means whereby a connection may be established between either detecting member and the common operating member, and means whereby the common operating member controls the operation of the stopping devices, substantially as described.

27. In a detecting mechanism, the combination with stopping devices, of a detector, means for giving the detector a sweeping movement over the material-path, a controller moving with the detector, an operating member, means for moving said member, means whereby the movement of the operating member controls the operation of the stopping devices, and means whereby a variation in the movement of the detector varies the movement of the operating member, substantially as described.

28. In a detecting mechanism, the combination with stopping devices, of a detector, means for giving the detector a sweeping movement over the material-path, a controller moving with the detector, an operating-shaft, means for moving the shaft, means whereby the movement of the shaft controls the operation of the stopping devices, and means whereby a variation in the movement of the detector varies the movement of the shaft, substantially as described.

29. In a detecting mechanism, the combination with stopping devices, of an actuating mechanism therefor, a shaft, means whereby the shaft controls the operation of the actuating mechanism, a detector, means for giving the detector a sweeping movement over the material-path, said detector being arranged to have its movement varied by the presence in the material-path of a predetermined thickness of material, and means whereby a variation in the movement of the detector varies the movement of the shaft and controls the operation of the actuating mechanism, substantially as described.

30. In a detecting mechanism, the combination with stopping devices, of an actuating mechanism therefor, normally operative connections between the actuating mechanism and the stopping devices, means for breaking said connections, a detector in the path of the material, and means whereby the presence in said path of a predetermined amount of material prevents the breaking means from operating, substantially as described.

31. In a detecting mechanism, the combination with stopping devices, of an actuator-arm, means for moving the arm, connections intermediate the arm and the stopping devices, means for preventing the engagement of the arm and the connections, a detector, means for moving the detector over the path of the material, the detector being constructed to have its movement varied by the presence in its path of a predetermined amount of material, and means whereby the variation in the movement of the detector controls the operation of the preventing means, substantially as described.

32. In a detecting mechanism, the combination with stopping devices, of an actuator-arm, means for moving the arm, connections intermediate the arm and the stopping devices, means for preventing the engagement of the arm and the connections, a detector, means for giving the detector a sweeping movement over the material-path, the detector being constructed to have its movement varied by the presence in its path of a predetermined amount of material, and means whereby the variation in the movement of the detector controls the operation of the preventing means, substantially as described.

33. In a detecting mechanism, the combination with stopping devices, of an actuator-arm, connections intermediate the arm and the stopping devices, a shaft, a positioning-arm on the shaft, a detector, means for moving the detector over the material-path, said detector being constructed to have its movement varied by the presence in its path of a predetermined amount of material, a controller moving with the detector, and means for establishing a connection between the shaft and the controller, whereby the variation in the movement of the controller varies the movement of the shaft, substantially as described.

34. In a detecting mechanism, the combination with stopping devices, of a detector, means for oscillating the detector over the path of the material and tangentially thereto, said detector being constructed to have its movement varied by the presence in its path of a predetermined amount of material, a controller moving with the detector, a shaft, means for moving the shaft, means for establishing a connection between the shaft and the controller, whereby a variation in the movement of the controller varies the movement of the shaft, and devices controlled by the movement of the shaft for controlling the operation of the stopping devices, substantially as described.

35. In a detecting mechanism, the combination with stopping devices, of a detector, an abutment stationary with respect to the passing material coöperating with the detector, means for oscillating the detector over the path of the material and tangentially thereto, said detector being constructed to have its movement varied by the presence in its path of a predetermined amount of material, a controller moving with the detector, a shaft, means for moving the shaft, means for establishing a connection between the shaft and the controller, whereby a variation in the movement of the controller varies the movement of the shaft, and devices controlled by the movement of the shaft for controlling the operation of the stopping devices, substantially as described.

36. In a detecting mechanism, the combination with stopping devices, of a detector, means for oscillating the detector over the material-path and tangentially thereto, said detector being constructed to have its movement varied by the presence in its path of a predetermined thickness of material, an abutment coöperating with the detector, a controller moving with the detector, a moving operating member, means for establishing a connection between the moving member and the controller whereby a variation in the movement of the detector varies the movement of the member, and means whereby the variation in the movement of the member controls the movement of the stopping devices, substantially as described.

37. In a detecting mechanism, the combination with stopping devices, of a detector, means for oscillating the detector over the material-path and tangentially thereto, said detector being constructed to have its movement varied by the presence in its path of a predetermined thickness of material, an abutment coöperating with the detector, a controller moving with the detector, an operating-shaft, an arm on the shaft, said arm being arranged to be engaged by the controller when the movement of the detector is varied, whereby the variation in the movement of the detector is communicated to the shaft, and means whereby variation in the movement of the shaft controls the operation of the stopping devices, substantially as described.

38. In a detecting mechanism, the combination with stopping devices, of a detector, means for oscillating the detector over the material-path, said detector being constructed to have its movement varied by the presence in its path of a predetermined thickness of material, an abutment coöperating with the detector, a controller moving with the detector, an operating-shaft, an arm on the shaft arranged to be engaged by the controller when its movement is varied, an actuating device, connections intermediate the actuating device and the stopping device, and a positioning-arm carried by the shaft, substantially as described.

39. In a detecting mechanism, the combination with stopping devices, of a detector, means for oscillating the detector over the material-path and tangentially thereto, said detector being constructed to have its movement varied by the presence in its path of a predetermined thickness of material, an abutment coöperating with the detector, a controller moving with the detector, an operating-shaft, an arm on the shaft arranged to be engaged by the controller when its movement is varied, an actuating device, connections intermediate the actuating device and the stopping device, and a positioning-arm carried by the shaft, substantially as described.

40. In a detecting mechanism, the combination with stopping devices, of a support, a two-part abutment mounted on the support, the parts of the abutment being adjustable thereon, a detector including oscillating detecting members with which the abutment coöperates, springs for oscillating the detecting members over the material-path, the springs being so proportioned that the presence of a predetermined amount of material in the path will vary the movement of the detecting members, controllers moving with the detecting members, an operating-shaft, arms on the shaft one for each controller, said arms being arranged to be engaged by the controllers when the movement of the detector is varied, an actuating mechanism, connections intermediate the actuating mechanism and the stopping devices, and a positioning-arm carried by the operating-shaft and controlling said connections, substantially as described.

41. In a detecting mechanism, the combination with stopping devices, of a support, a two-part abutment mounted on the support and stationary with respect to the travel of the material, the parts of the abutment being adjustable on said support, a detector including oscillating members with which the abutment coöperates, springs for oscillating the detecting members over the material-path, the springs being so proportioned that the presence of a predetermined amount of material in the path will vary the movement of the detecting members, controllers moving with the detecting members, an operating-shaft, arms on the shaft one for each controller, said arms being arranged to be engaged by the controllers when the movement of the detector is varied, an actuating mechanism, connections intermediate the actuating mechanism and the stopping devices, and a positioning-arm carried by the operating-shaft and controlling said connections, substantially as described.

In testimony whereof I have hereunto set my hand in the presence of two subscribing witnesses.

GEORGE R. WILLIAMS.

Witnesses:
A. COLE,
MORTON FOSTER.